United States Patent [19]
Gardner

[11] Patent Number: 6,141,694
[45] Date of Patent: Oct. 31, 2000

[54] DETERMINING AND VERIFYING USER DATA

[75] Inventor: Valerie A. Gardner, San Francisco, Calif.

[73] Assignee: WEBTV Networks, Inc., Mountain View, Calif.

[21] Appl. No.: 08/931,341

[22] Filed: Sep. 16, 1997

[51] Int. Cl.⁷ .................................................. G06F 15/16
[52] U.S. Cl. ............................................................. 709/240
[58] Field of Search ............................................ 709/240

[56] References Cited

U.S. PATENT DOCUMENTS

| | | | |
|---|---|---|---|
| 5,361,359 | 11/1994 | Tajalli et al. ............................. | 395/700 |
| 5,649,186 | 7/1997 | Ferguson .................................. | 395/610 |
| 5,774,742 | 6/1998 | Nakamura et al. ....................... | 395/828 |
| 5,809,493 | 9/1998 | Ahmad et al. ............................ | 206/52 |
| 5,832,520 | 11/1998 | Miller ...................................... | 707/203 |
| 5,848,397 | 12/1998 | Marsh et al. ............................. | 705/14 |
| 5,848,412 | 12/1998 | Rowland et al. ......................... | 707/9 |
| 5,870,740 | 2/1999 | Rose et al. ................................ | 707/5 |
| 5,884,272 | 3/1999 | Walker et al. ............................ | 705/1 |

FOREIGN PATENT DOCUMENTS

WO 93/09631  5/1993  WIPO .

*Primary Examiner*—Frank Asta
*Assistant Examiner*—Stephan Willett
*Attorney, Agent, or Firm*—Workman, Nydegger, Seeley

[57] ABSTRACT

A method and apparatus for determining and verifying user data are provided. One or more facts about the user of a client system such as an internet terminal are maintained in a set of information fields, each information field is associated with a status field for indicating a level of certainty regarding the accuracy of the information contained in the corresponding information field. It is determined whether or not a source of data exists that is more reliable than the currently stored information. If a more reliable source of data is determined to exist, then information is retrieved from the more reliable source of data and the current information is replaced with the retrieved information. According to another aspect of the present invention the accuracy of facts gathered about a user of a client system are evaluated by monitoring online activity of the user. For example, information transmitted between a server system and the client system may be observed. Based upon these observations a confidence level may be determined for the current user data.

19 Claims, 8 Drawing Sheets

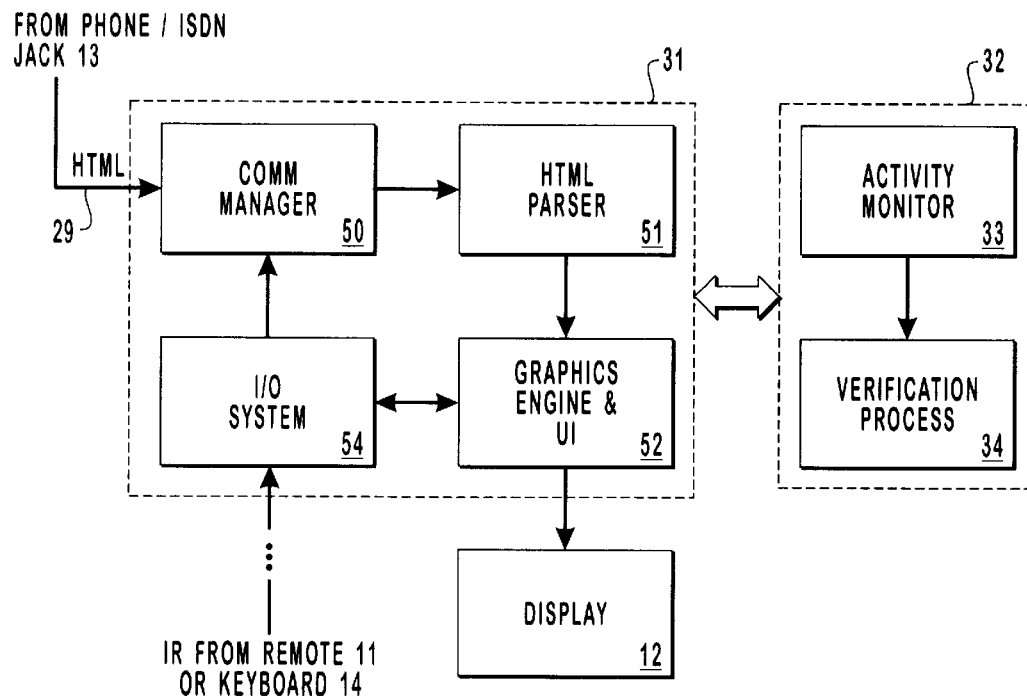

FIG. 4A

```
      <HTML><HEAD>
      <TITLE>Order Entry Form</TITLE>
      </HEAD><BODY>
      <H2>Please provide the following information for order processing</H2>
      <FORM METHOD=POST ACTION=".../cgi-bin/ProcessOrder">
406   <P>Enter your Name: <INPUT TYPE="text" NAME="theName"><BR>
407   Enter your SSN:
408   <INPUT TYPE="text" NAME="theSSN"><BR>
409   Enter your Age:
410   <INPUT TYPE="text" NAME="theAge"><BR>
411   Enter your Address:
412   <INPUT TYPE="text" NAME="theAddress"><BR>
413   Enter the catalog number:
414   <INPUT TYPE="text" NAME="theCatNum"><BR>
415   Enter your credit card number:
416   <INPUT TYPE="text" NAME="theCreditCard"><BR>
      • • •
      </FORM>
      </BODY>
      </HTML>
```

FIG. 4B

DETERMINING AND VERIFYING USER DATA

FIELD OF THE INVENTION

The invention relates generally the field of client-server computer networking. More particularly, the invention relates to the use of online resources to determine facts about a user and the verification of user data with reference to the user's online activities.

BACKGROUND OF THE INVENTION

The number of people using the Internet and the World Wide Web (the Web) has increased substantially in recent years. Not surprisingly, this increase has been accompanied by growth in electronic transactions in goods and services on the Web dubbed "Electronic Commerce." While many efficiencies are achieved by exploiting this new medium, Electronic Commerce presents new complications for both customers and the firms supplying the goods and/or services.

Customers, for example, worry about the security and privacy of the transactions and are therefore hesitant to transmit payment information over the Internet. Firms, on the other hand, have difficulty verifying facts such as identity, age, and credit worthiness of customers. The customary methods of identification verification, available in face-to-face transactions, are not suitable for electronic transactions.

Currently, in the context of providing a remote service such as providing user accounts for Internet and Web access, for example, there is no simple solution for verifying information provided by a prospective user. Customers activating user accounts may provide inaccurate information with respect to their name, age, gender, billing information, etc. Typically, commercial Internet access providers such as WebTV Networks, Inc., America Online™, CompuServe™ or the like activate user accounts upon being provided with a credit card number during an initial access to the service. This puts the provider at risk of losing the expected revenue from this user should the person providing the credit card number be a minor or someone without authority to use the card.

Based on the foregoing, it is desirable to provide a method and apparatus for determination and verification of user data. Specifically, it is desirable to acquire information about the user with reference to reliable resources and/or based upon the user's online activities.

SUMMARY OF THE INVENTION

A method and apparatus for determining and verifying user data are described. One or more facts about the user of a client system such as an Internet terminal are maintained in a set of information fields, each information field is associated with a status field for indicating a level of certainty regarding the accuracy of the information contained in the corresponding information field. It is determined whether or not a source of data exists that is more reliable than the currently stored information. If a more reliable source of data is determined to exist, then information is retrieved from the more reliable source of data and the current information is replaced with the retrieved information.

According to another aspect of the present invention the accuracy of facts gathered about a user of a client system are evaluated by monitoring online activity of the user. For example, information transmitted between a server system and the client system may be observed. Based upon these observations a confidence level may be determined for the current user data.

The present invention takes advantage of the ongoing contacts between Internet access providers, for example, and their customers. Firms with such contacts are in a unique position to confirm facts about their customers and other data with reference to the customers' online activities. While this information is valuable in determining legal responsibility, there are other advantages of acquiring and maintaining information on customers. For example, with this information, firms can tailor advertising to customers that are likely to be interested.

Other features and advantages of the present invention will be apparent from the accompanying drawings and from the detailed description which follows.

BRIEF DESCRIPTION OF THE DRAWINGS

The present invention is illustrated by way of example, and not by way of limitation, in the figures of the accompanying drawings and in which like reference numerals refer to similar elements and in which:

FIG. 4A is a block diagram of exemplary application software for use in an Internet terminal.

FIG. 4B is an example of a simple HTML document for displaying an HTML form.

DETAILED DESCRIPTION

A method and apparatus are described for determining and maintaining facts about a user. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps, which will be described below. The steps can be embodied in machine-executable instructions, which can be used to cause a general-purpose or special-purpose processor programmed with the instruction to perform the steps. Alternatively, the steps of the present invention might be performed by specific hardware components that contain hardwired logic for performing the steps, or by any combination of programmed computer components and custom hardware components.

While embodiments of the present invention will be described with respect to Hypertext Markup Language (HTML) documents, the method and apparatus described herein are equally applicable to other types of documents such as markup language files generally, other formatted text files, plain text files, and other document types commonly found on the Web. Further, embodiments of the present invention will be described in the context of an Internet terminal, however, it will be apparent that the present invention is equally applicable in other client system environments and is operable within a server system as well.

SYSTEM OVERVIEW

The present invention may be included in a system, known as WebTV™, for providing a user with access to the Internet. WebTV™ and WebTV Networks™ are trademarks of WebTV Networks, Inc. of Palo Alto, Calif. A user of a WebTV client generally accesses a WebTV server via a direct-dial telephone (POTS, for "plain old telephone service"), ISDN (Integrated Services Digital Network), or other similar connection, in order to browse the Web, send and receive e-mail, and use various other WebTV network services. The WebTV network services are provided by WebTV servers using software residing within the WebTV servers in conjunction with software residing within a WebTV client.

Figure 1:
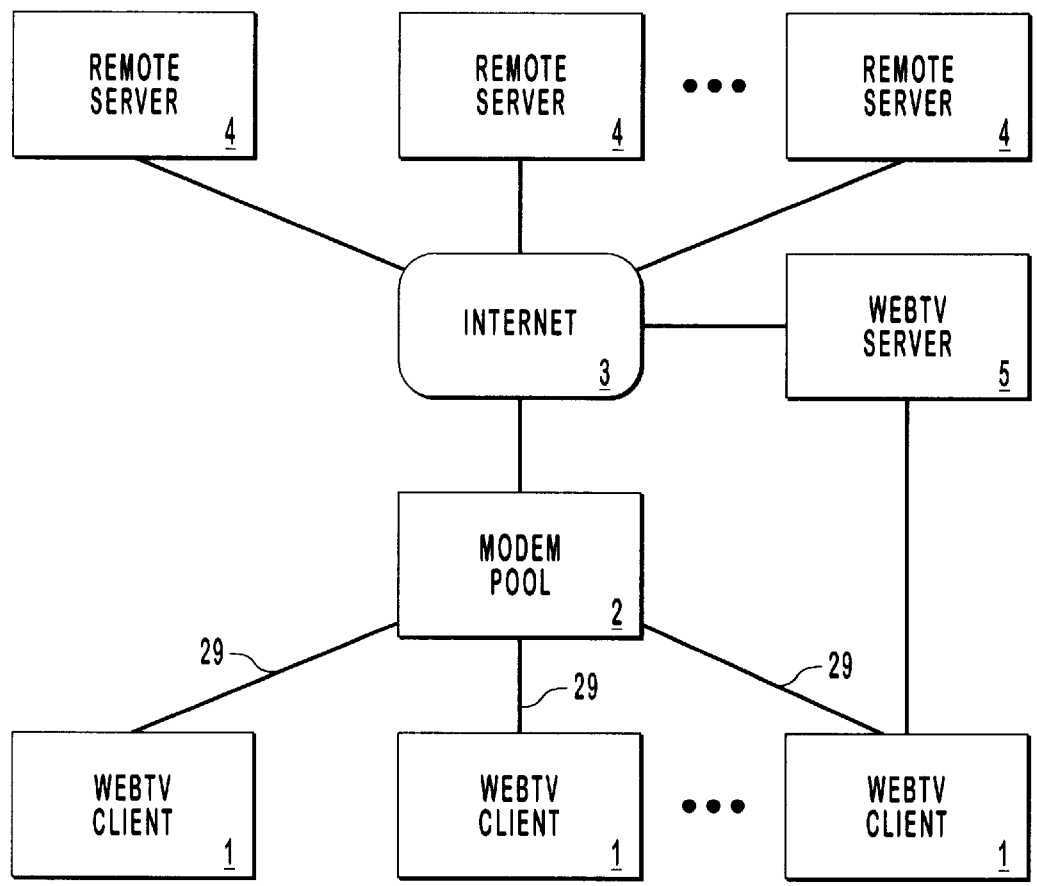
FIG. 1 illustrates several clients connected to a server in a network.

FIG. 1 illustrates a basic configuration of the WebTV network according to one embodiment. A number of WebTV clients 1 are coupled to a modem pool 2 via direct-dial, bidirectional data connections 29, which may be telephone (POTS, i.e., "plain old telephone service"), ISDN (Integrated Services Digital Network), or any other similar type of connection. The modem pool 2 is coupled typically through a route, such as that conventionally known in the art, to a number of remote servers 4 via a conventional network infrastructure 3, such as the Internet. The WebTV system also includes a WebTV server 5, which specifically supports the WebTV clients 1. The WebTV clients 1 each have a connection to the WebTV server 5 either directly or through the modem pool 2 and the Internet 3. Note that the modem pool 2 is a conventional modem pool, such as those found today throughout the world providing access to the Internet and private networks.

Note that in this description, in order to facilitate explanation the WebTV server 5 is generally discussed as if it were a single device, and functions performed and/or provided by the WebTV services are generally discussed as being performed by such single device. However, the WebTV server 5 may actually comprise multiple physical and logical devices connected in a distributed architecture, and the various functions discussed below may actually be distributed among multiple WebTV server devices.

AN EXEMPLARY CLIENT SYSTEM

Figure 2:
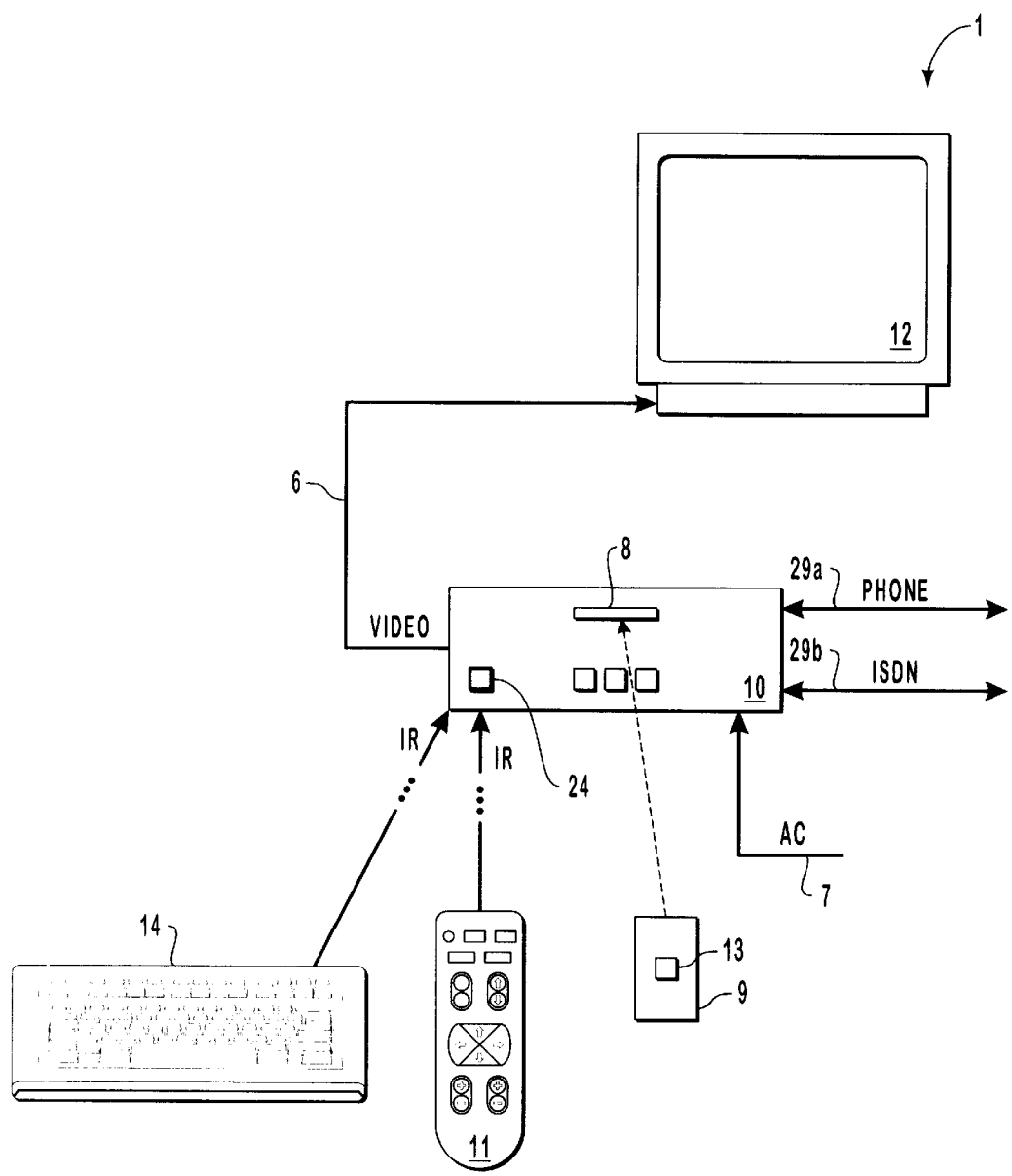
FIG. 2 illustrates a client system according to one embodiment of the present invention.

FIG. 2 illustrates a WebTV client 1 according to one embodiment of the present invention. In this embodiment, the WebTV client 1 includes an Internet terminal 10 (hereinafter referred to as "the WebTV box 10"), an ordinary television set 12, and a remote control 11. In an alternative embodiment of the present invention, the WebTV box 10 is built into the television set 12 as an integral unit. The WebTV box 10 includes hardware and software for providing the user with a graphical user interface, by which the user can access the WebTV network services, browse the Web, send e-mail, and otherwise access the Internet.

The WebTV client 1 uses the television set 12 as a display device. The WebTV box 10 is coupled to the television set 12 by a video link 6. The video link 6 is an RF (radio frequency), S-video, composite video, or other equivalent form of video link. In the preferred embodiment, the client 1 includes both a standard modem and an ISDN modem, such that the communication link 29 between the WebTV box 10 and the server 5 can be either a telephone (POTS) connection 29a or an ISDN connection 29b. The WebTV box 10 receives power through a power line 7.

The WebTV box 10 also includes a SmartCard slot 8 for receiving an optional SmartCard 9. The SmartCard 9 is a plastic card that includes a memory chip 13. In one embodiment, the memory chip 13 stores information about the owner/user as well as identification information for uniquely identifying the SmartCard 9. Various semiconductor memories may be used for memory chip 13 such as a programmable ROM (PROM), any form of erasable PROM (EPROM) or Flash memory. Other storage devices are also suitable for use as the memory chip 13. In alternative embodiments, the SmartCard 9 may additionally include one or more microprocessors and/or additional memory chips such as a random access memory (RAM), for example.

In the embodiment depicted, the user may operate remote control 11 to control the WebTV client 1 in browsing the Web, sending e-mail, and performing other Internet-related functions such as ordering products and services. The WebTV box 10 receives commands from remote control 11 via an infrared (IR) communication link. In alternative embodiments, the link between the remote control 11 and the WebTV box 10 may be RF or any equivalent mode of transmission.

Figure 3:
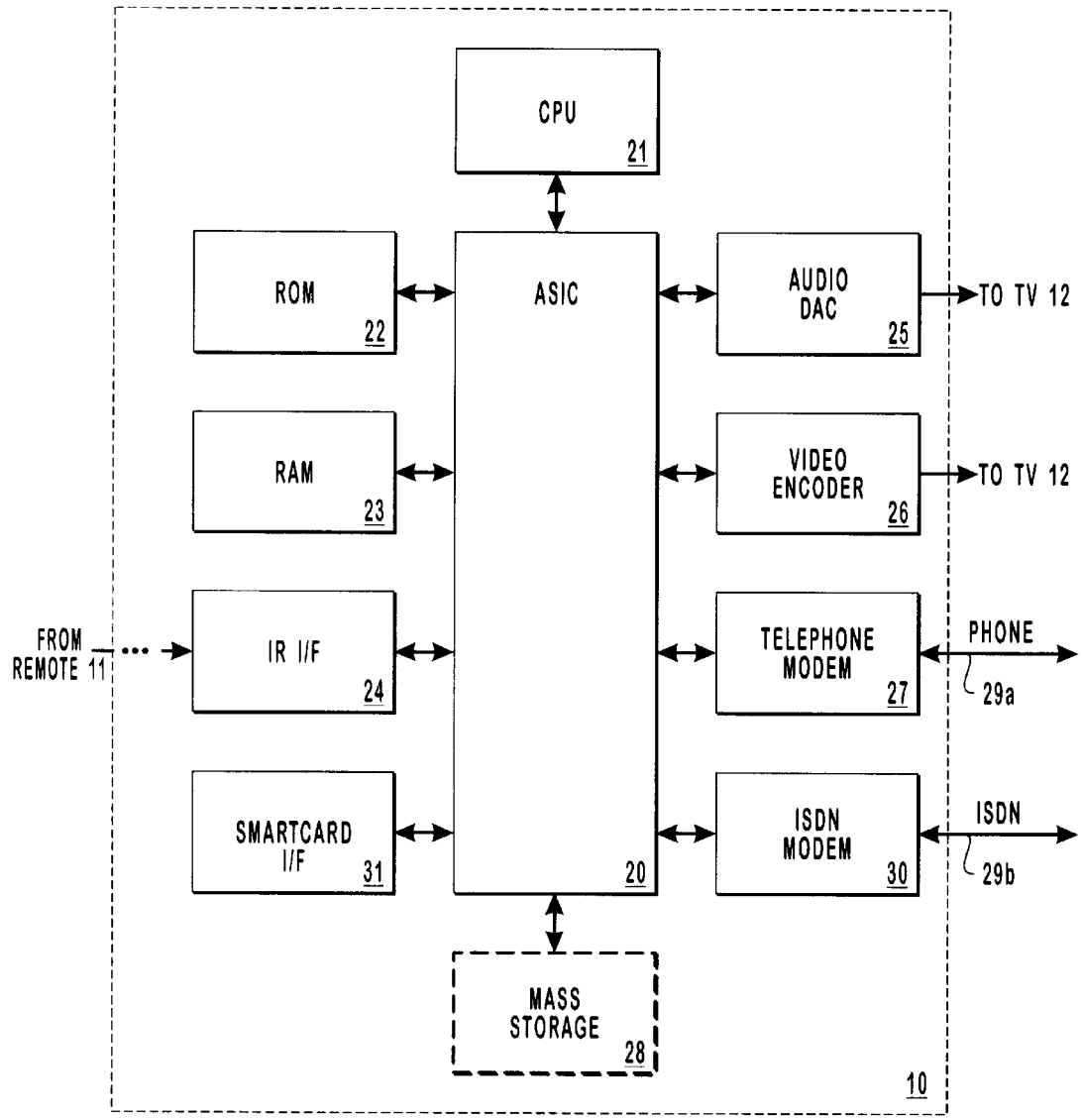
FIG. 3 is a block diagram of an Internet terminal according to one embodiment of the present invention used to implement a Web browser that can be operated by remote control.

FIG. 3 is a block diagram of the internal features of the WebTV box 10 according to one embodiment of the present invention. In this embodiment, operation of the WebTV client 1 is controlled by a central processing unit (CPU) 21 which is coupled to an Application-Specific Integrated Circuit (ASIC) 20. The CPU 21 may execute software designed to implement features of the present invention. ASIC 20 contains circuitry which is used to implement certain features provided by the WebTV client 1. ASIC 20 is coupled to an audio digital-to-analog converter 25 which provides audio output to television 12. In addition, ASIC 20 is coupled to a video encoder 26 which provides video output to television set 12. An IR interface 24 detects IR signals transmitted by remote control 11 and, in response, provides corresponding electrical signals to ASIC 20. ASIC 20 is further coupled to a SmartCard interface 31. The SmartCard interface 31 detects the presence of a SmartCard such as SmartCard 9 and signals the ASIC 20 accordingly. A standard telephone modem 27 and an ISDN modem 30 are coupled to ASIC 20 to provide connections 29a and 29b, respectively, to the modem pool 2 and, via the Internet 3, to the remote servers 4. Note that the WebTV box 10 also may include a cable television modem (not shown).

Also coupled to ASIC 20 is Read-Only Memory (ROM) 22, which provides storage of program code for implementing the application software to be executed by the WebTV box 10. Note that ROM 22 may be a programmable ROM (PROM) or any form of erasable PROM (EPROM) or Flash memory. Also coupled to ASIC 20 is Random Access Memory (RAM) 23. A mass storage device 28 may optionally be provided and coupled to ASIC 20. The mass storage device 28 may be used to input software or data to the client or to download software or data received over network connection 29. The mass storage device 28 includes any suitable medium for storing machine-executable instructions, such as magnetic disks, optical disks, and the like.

EXEMPLARY CLIENT APPLICATION SOFTWARE COMPONENTS

Web browser functions of the WebTV box 10 may be implemented by software executing on CPU 21, for example. FIG. 4A illustrates the functional relationships between various components of an exemplary set of application software components. In this embodiment, application software 31 includes a communications manager 50, a Hypertext Markup Language (HTML) parser 51, a graphics engine and user interface 52, an input/output (I/O) system 54, and an activity monitor 53.

The client system may receive Web pages over network connection 29 in the form of HTML documents. Each HTML document is initially input to the communications manager 50. The communications manager 50 performs functions necessary to receive HTML documents over the network connection 29 including handling high-level communications protocols, such as HTTP (Hypertext Transport Protocol), TCP/IP (Transmission Control Protocol/Internet Protocol), etc.

Received HTML documents are provided by communications manager 50 to HTML parser 51. The HTML parser 51 converts HTML page descriptions into a displayable format for the client system. As will be discussed further below, the HTML parser 51 also supplies information to application software 32 for tracking and/or statistical analysis of online user activity through an application program interface, for example.

As is well known, an HTML document may contain text and/or refer to images. Further, an HTML document may include one or more displayable objects and provide links to other Web pages. The objects which are to be displayed on a screen are defined in the HTML document by a number of "tags" which specify information relating to the object and its attributes (e.g., whether the object is a text input field, a radio button, a checkbox, an image map, etc.). Accordingly, one function of the HTML parser 51 is to separate tags from text within each HTML document. HTML parser 51 also provides image information, such as JPEG or GIF image information, to the graphics engine and user interface 52, which is responsible for rendering such images. The graphics engine and user interface 52 also receives the output of the HTML parser 51 and presents Web pages to a local user via the display 12.

In the course of browsing the Web (e.g., navigating among one or more Web pages), the I/O system 54 may receive input from the remote 11 and the keyboard 14, for example. The I/O system 54 provides the input to the graphics engine and user interface 52. If a link to another Web page is selected, the I/O system 54 supplies the URL (Uniform Resource Locator) or other logical address indicating the location of the Web page to the communications manager 50 and to application software 32.

In the embodiment depicted, the application software 32 is comprised of an activity monitor 33 and a verification process 34. The HTML parser 51 provides information regarding all input received by the WebTV box 10 such as HTML documents to the activity monitor 33. Further, the I/O system 54 provides information regarding all output to be transmitted to the server 5 such as URLs to the activity monitor 33. Thus, the activity monitor 33 has access to all input to the client 1 and all output from the client 1. One function of the verification process 34 may be to retrieve user data from reliable resources such as online resources, the user's SmartCard 9, or other sources of data. The monitoring of user activity and verification processing will be discussed further below.

Referring now to FIG. 4B, an example of a simple HTML document for displaying an HTML form is depicted. HTML document 400 includes lines 406 through 416. The purpose of this sample form is to solicit information from a user about a product order. The HTML form resulting from HTML document 400 prompts the user for several text inputs. Lines 406, 407, 409, and 411 prompt the user for his/her Name, SSN, Age, and Address, respectively. Further, at line 413, the catalog number for the goods or services desired is requested. Finally, at line 415, the user's credit card number is requested. Lines 406, 408, 410, 412, 414, and 416 contain <INPUT> tags which include two attributes: TYPE and NAME. The TYPE attribute indicates the type of form element that is to be displayed. In this example, all the form elements are text-entry fields. The NAME attribute indicates the name to be associated with the particular form element.

When an HTML form is submitted, the browser software receives all the names and values from the form input, performs URL encoding, and transmits the information to the appropriate server designated by the form. Input to HTML forms is typically processed by a Common Gateway Interface (CGI) script on the receiving server. The CGI script receives the form input as a series of name/value pairs. The name is the value of the NAME attribute and the value is the actual value input by the user. If descriptive names have been used in the form, then the values can be easily matched up with the prompts on the server side. The following is an exemplary set of name/value pairs that may be produced by the browser software as a result of input to the HTML form created by HTML document 400: "theName=Val+Gardner&theSSN=123+45+7890&theAge= &theAddress=& theCatNum=00838&theCreditCard= 1234+5678+9011+1213"

AN EXEMPLARY SERVER SYSTEM

Figure 5:
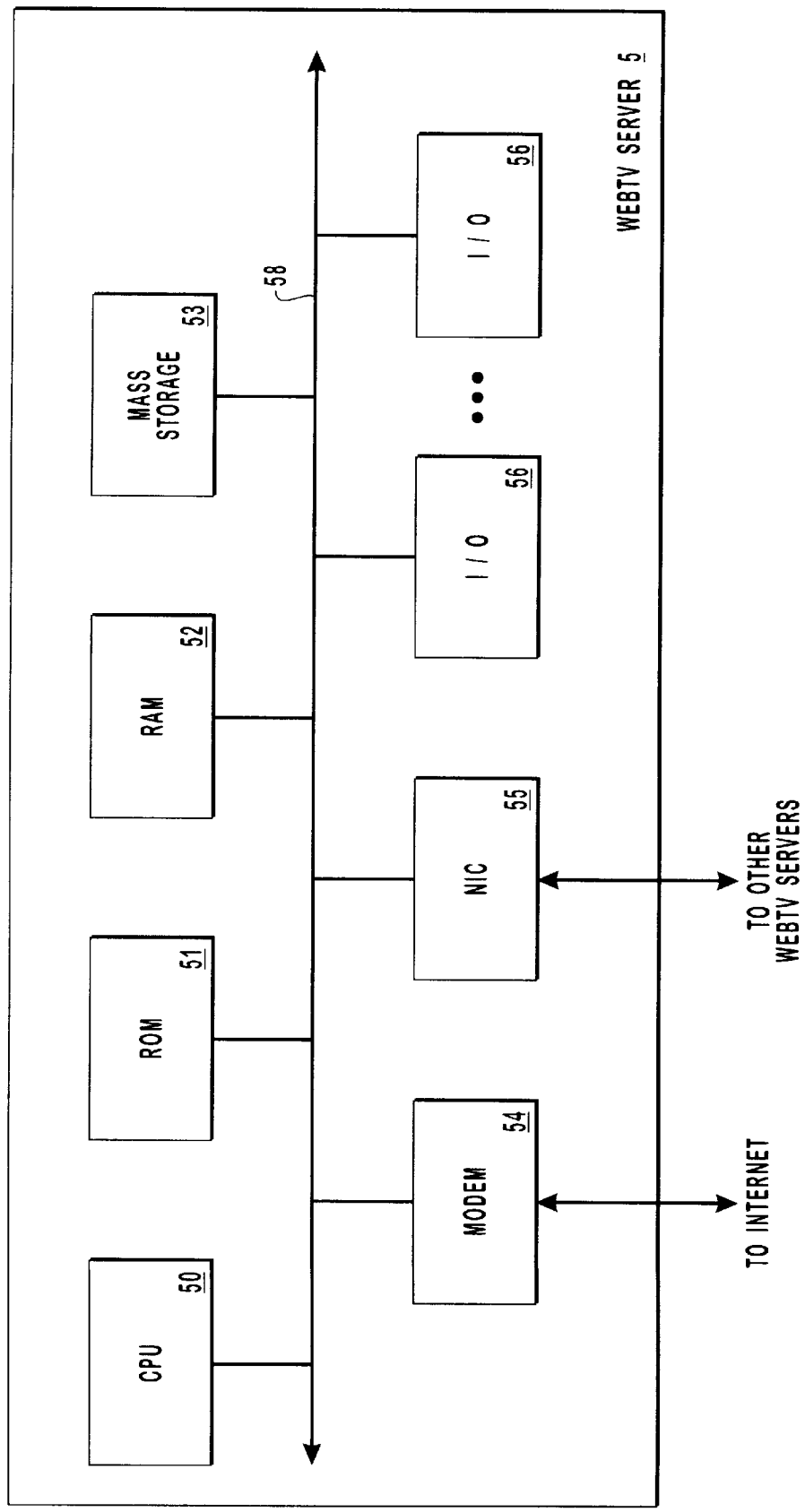
FIG. 5 is a block diagram of a server according to one embodiment of the present invention.

The WebTV server 5 generally includes one or more computer systems generally having the architecture illustrated in FIG. 5. It should be noted that the illustrated architecture is only exemplary; the present invention is not constrained to this particular architecture. The illustrated architecture includes a central processing unit (CPU) 50, random access memory (RAM) 51, read-only memory (ROM) 52, a mass storage device 53, a modem 54, a network interface card (NIC) 55, and various other input/output (I/0) devices 56. The CPU 50 may execute software designed to implement features of the present invention. Mass storage device 53 includes a magnetic, optical, or other equivalent storage medium. I/O devices 56 may include any or all of devices such as a display monitor, keyboard, cursor control device, etc. Modem 54 is used to communicate data to and from remote servers 4 via the Internet.

As noted above, the WebTV server 5 may actually comprise multiple physical and logical devices connected in a distributed architecture. Accordingly, NIC 55 is used to provide data communication with other devices that are part of the WebTV services. Modem 54 may also be used to communicate with other devices that are part of the WebTV services and which are not located in close geographic proximity to the illustrated device.

While activity monitoring and verification processing functions were discussed with reference to the WebTV client 1, similar monitoring and verification can be achieved on the WebTV server 5. For example, software components similar to those described above may be executed on CPU 50.

MAINTAINING USER DATA

Having described exemplary system environments in which the present invention may be implemented, maintenance of user data will now be described with reference to FIGS. 6 through 8. "User data" refers generally to attributes, characteristics or other facts about the user including but not limited to name, age, gender, address, income, etc. User data can be determined and/or verified in a number of ways. One strategy includes retrieving factual data about a user from an online resource such as a database existing on a remote server.

Another strategy includes monitoring the user's online activities. By monitoring data received by the client 1 and/or data transmitted from the client 1 to the server 5, the desired user data may be acquired directly from the user or indirectly based upon information communicated between the client 1 and server 5. Additionally, data may be read from the memory of the user's SmartCard 9.

Finally, the assignees of the present invention envision that a standardized rating scheme will someday be employed for categorizing Web pages. Preferably, a category tag will be transmitted with the HTML document or an indication of the category will be embedded within the HTML document itself. It should be appreciated that more refined categories will facilitate the determination and verification of user data. In any event, category information, regardless of the nature of the category information and however it is conveyed, may be inspected by the client 1 or the sever 5. Because this information is available for inspection, statistical information may be tracked based upon the user's requests. For example, categories relevant to ascertaining desired user data may be monitored. Further, category information may also be used in performing conflict analysis. For example, if the sites requested by the user are inconsistent with his/her stated age, the age data may be marked to reflect the unreliability of the current data. While any one of the above methods are useful separately, combinations of one or more of the above methods can further improve the determination and/or confirmation of user data.

Figure 6:
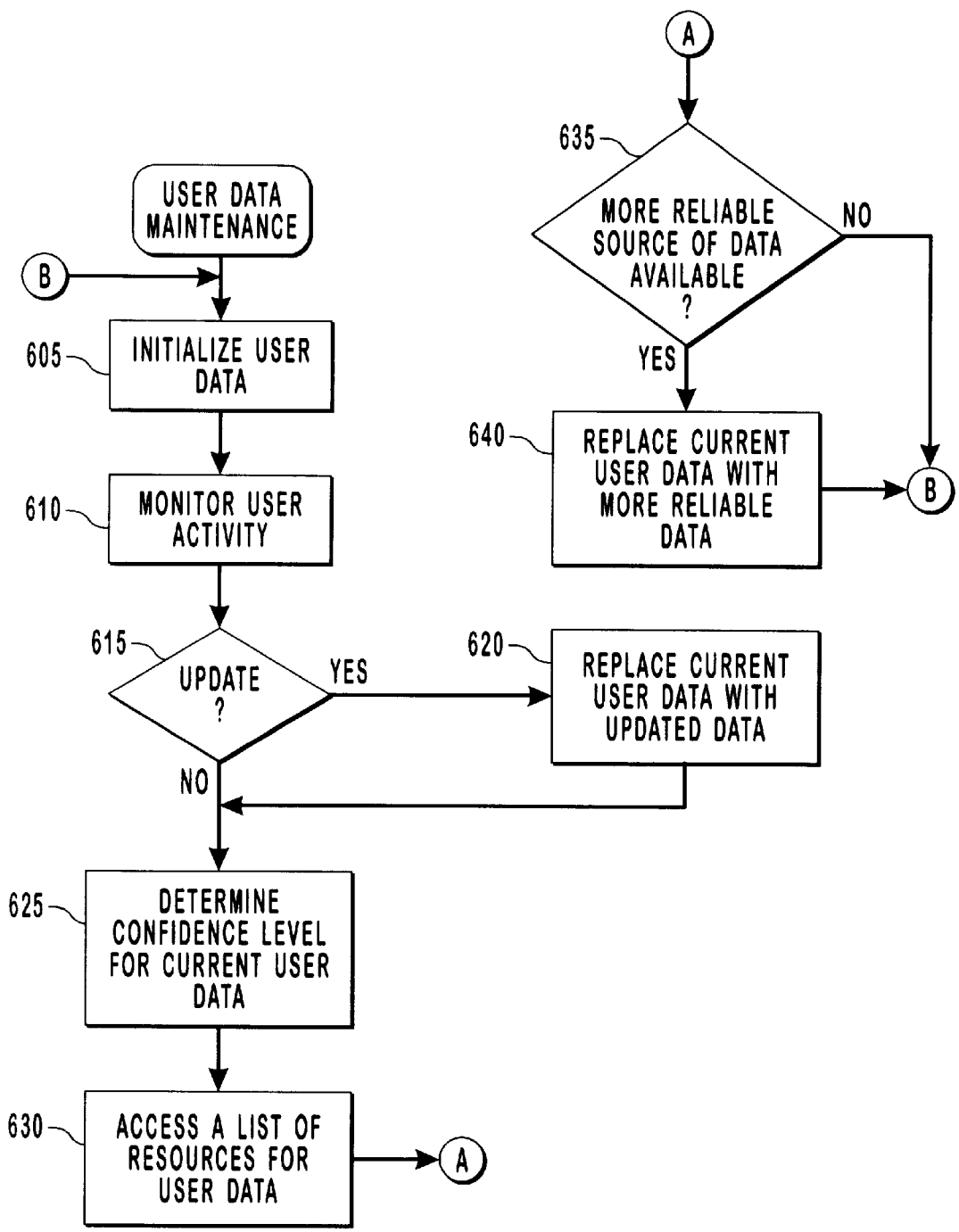
FIG. 6 is a flow diagram illustrating the maintenance of user data according to one embodiment of the present invention

FIG. 6 is a flow diagram illustrating the maintenance of user data according to one embodiment of the present invention. A user's profile changes over the course of time, therefore it is important to periodically verify user data. Information may initially be requested of the user and may be stored in one or more information fields in a database on the server, for example. Alternatively, the user data may be stored in client storage such as mass storage 28 or in a smart card memory such as memory chip 13. In any event, each information field may be associated with a status field which indicates the level of certainty regarding the accuracy of the current contents of the corresponding information field. A list of remote databases and relative reliability ratings may also be maintained. A determination can periodically be made with reference to a particular status field and the available remote databases as to the existence of a more reliable source of data for the corresponding information field. If a more reliable source of data exists for a particular information field, the more reliable information may be retrieved from the appropriate database(s) and the current user data may be replaced with the retrieved information. Such databases may include a Department of Motor Vehicles (DMV) database, a database of birth records, or other commercially available databases.

At step 605, the user data is initialized. Initial values may be requested of the user, user data may be assigned default values (e.g., age may be assumed to be 18 or greater), values may be left undefined, or a combination of the above may be employed.

At step 610, the user's online activity is monitored. This may include monitoring data transmitted to the server 5 from the client 1 (e.g., data input by the user) and data received by the client 1. The monitoring of user activity will be discussed in more detail below.

At step 615, a determination is made regarding whether or not to update the currently stored user data. This determination may take into account information accumulated during the step of monitoring. Exemplary situations calling for the current user data to be updated include user input of a value for a previously undefined information field and automatic updating of user data (e.g., age may be automatically incremented once a year on the user's birth date or an approximation thereof). Subsequent to the update determination, if the current user data is to be updated, at step 620, the currently stored user data is replaced with the updated data. If the current user data is not to be updated, processing continues with step 625.

At step 625, a confidence level may be determined for one or more of the information fields. In this embodiment, the confidence level represents one of a set of predefined levels of certainty regarding the accuracy of a value stored in a particular information field. One confidence level may indicate a high degree of confidence in the accuracy of the current value stored in the information field, another level may indicate that some uncertainty exists, and a third level may indicate the lowest degree of confidence. More or less confidence levels may be employed depending upon the resolution desired. The confidence level may be determined based upon data recorded during the monitoring of step 610 such as pointer activity, pointer activity statistics and/or conflict counts discussed below.

At step 630, a list of resources known to store user data may be accessed. The list of resources may provide uniform resource locators (URLs) of remote sites containing searchable databases with user data. Additionally, the list of resources may provide an indication of the types of user data available and the relative reliability of the data.

At step 635, it is determined whether or not a more reliable source of data is available for a one or more information fields. This determination may be accomplished by comparing the status field of a particular information field to the reliability indication associated with a given resource. If a more reliable source of data is available for an information field, then at step 640 the current user data stored in the information field can be replaced with data retrieved from the more reliable source of data. Otherwise, the processing may continue monitoring with step 610.

MONITORING USER ACTIVITY

Figure 7:
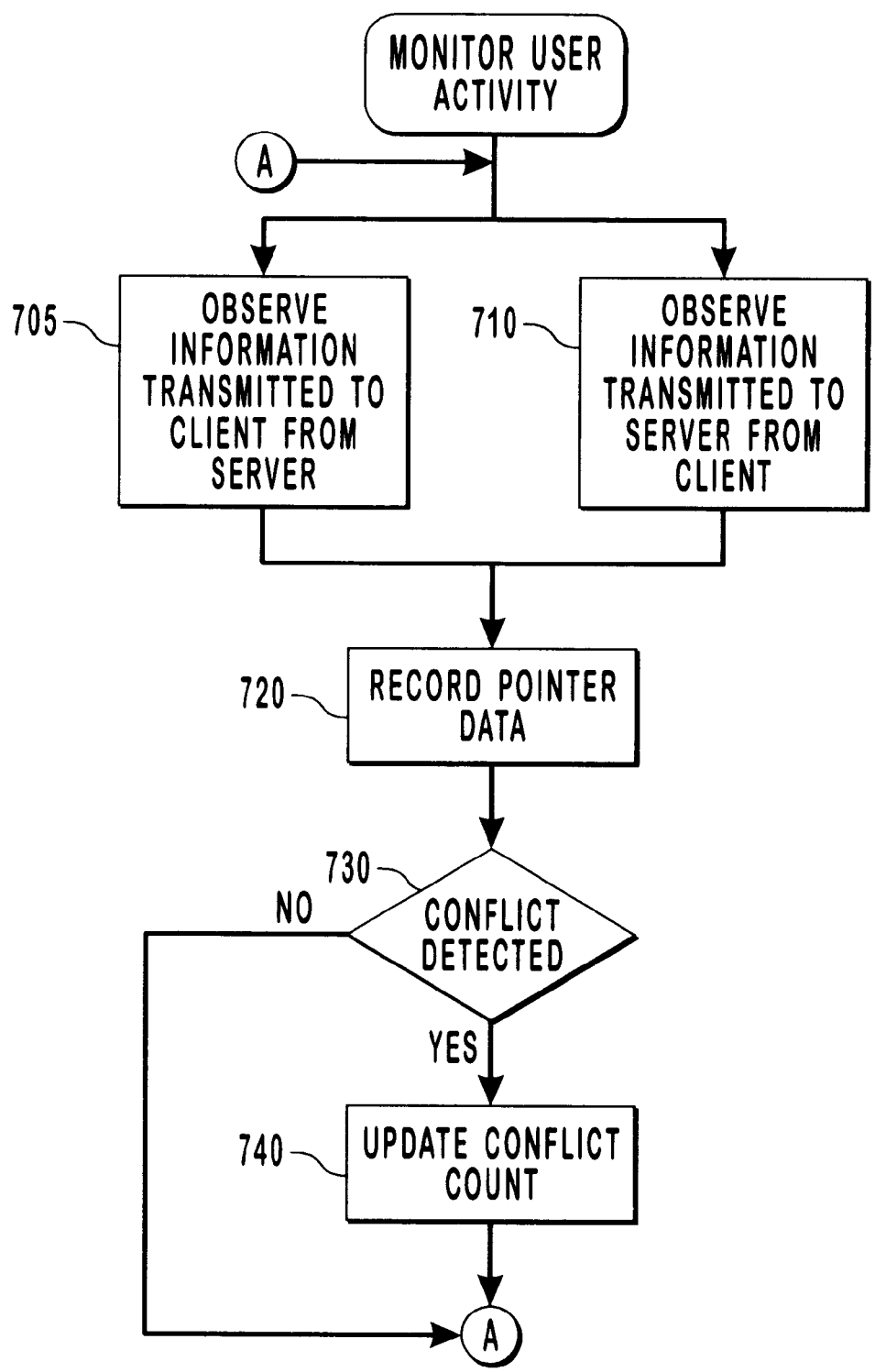
FIG. 7 is a flow diagram illustrating the monitoring of user activity according to one embodiment of the present invention.

FIG. 7 is a flow diagram illustrating the monitoring of user activity according to one embodiment of the present invention. In this embodiment, data received by the client 1 from the server 5 and/or data transmitted from the client 1 to the server 5 may be monitored. Data input by the user into HTML forms, for example, may be inspected to acquire desired information about the user. A process such as a background process running on the client 1 or server 5 may search the information transmitted between the server 5 system and the client 1 for the actual information desired or information that can be used to access online resources. Further, the information acquired during monitoring may also be used to assess a level of certainty regarding the accuracy of the currently stored user data. Additional information can be obtained by performing statistical analysis on sites visited such as the content of the sites and the categorization of the sites.

At step 705, information transmitted to the client 1 from the server 5 is observed. If the monitoring process is running on the client 1, the observation process (e.g., the activity monitor 32) may be triggered upon receipt of information by the client 1 by application software 31, for example. If the monitoring process is running on the server 5, the observation process may be invoked prior to transmission of information by the server 5. In either case, the information can be parsed and the resulting tokens can be matched against a predetermined set of values to find the data of interest. For example, if a particular user's age is unknown, the activity monitor 32 may search name/value pairs from HTML form inputs for names containing the string "age." Alternatively, if an online resource exists that is known to store reliable age data, then the verification process 34 may retrieve the user's age from the online resource.

At step 710, information transmitted to the server 5 from the client 1 is observed. As above, the monitoring/observation process may reside on either the client 1 or the server 5.

At step 720, certain pointer activity and/or the inferences resulting from the pointer activity may be recorded for use in user data maintenance and verification. "Pointer" activities include activities that reveal information about the user. For example, if the user requests a particular horoscope on a regular basis, it may be assumed that the user's birth date falls within the dates corresponding to the particular astrological sign requested. Tracking of such pointer activities and statistics related thereto may allow user data such as birth date to be accurately guessed.

In this embodiment, a conflict count is maintained to facilitate confidence level tracking. At step 730, it is determined whether or not the information observed in steps 705 or 710 conflict with the current user data. If so, at step 740, the conflict count for the particular information field that conflicts with the observed information is updated. Otherwise, step 740 is skipped processing may continue with steps 705 and/or 710.

It is important to note while embodiments of the present invention have been described with respect to observing HTML documents and user input into HTML forms, the present invention is not limited as such. In alternative embodiments, the other document types may be observed as well. For example plain text formats such as text submitted to a newsgroup, e-mail message, or the like may be searched for useful data as described above. Those of ordinary skill in the art will appreciate that the method described above may be adapted for monitoring other formatted document types as well such as variations on HTML or other future developed markup languages.

EXEMPLARY RELIABILITY HIERARCHIES

Figures 8A, 8B:
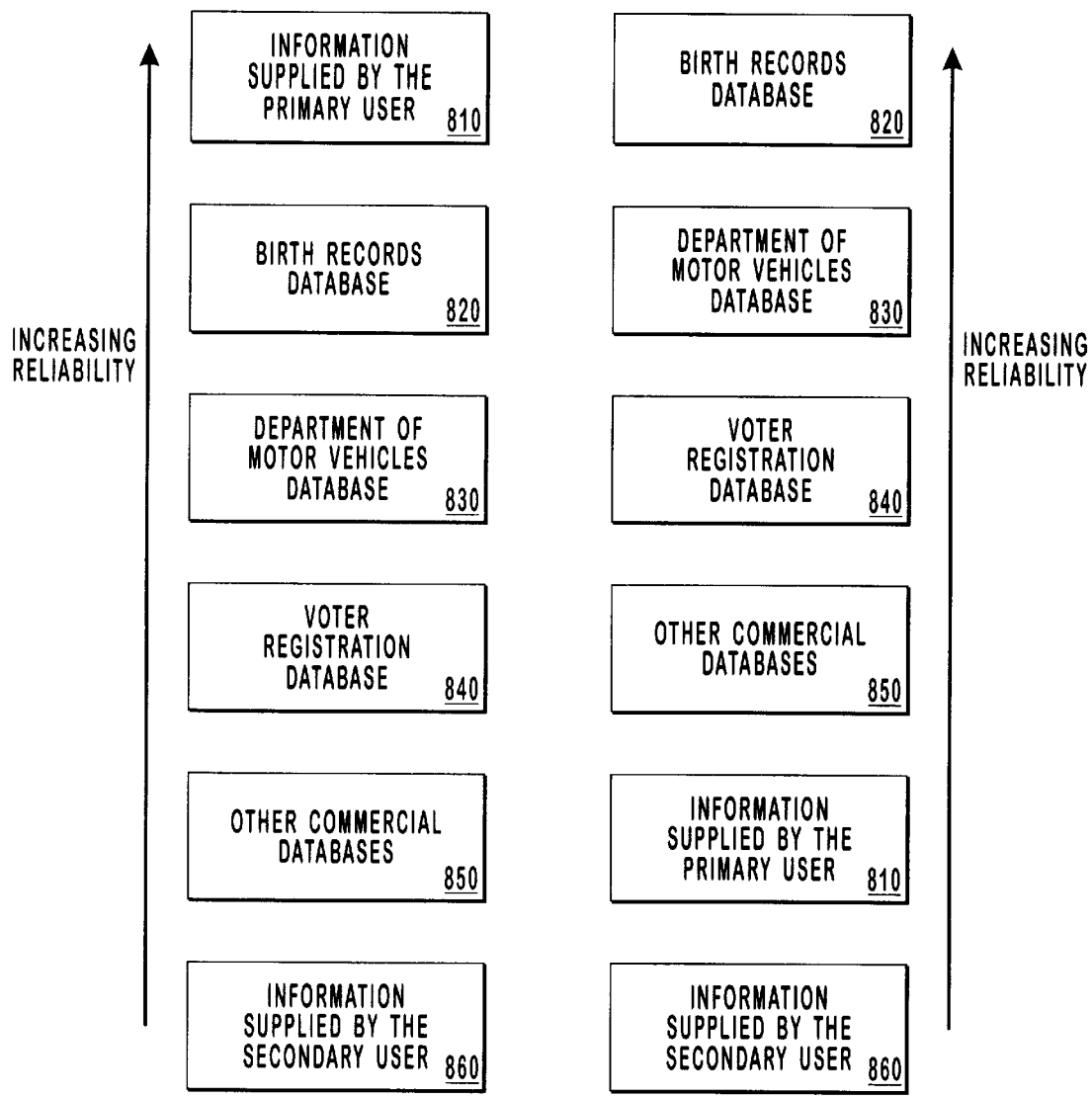
FIGS. 8A and 8B illustrate logical views of exemplary reliability hierarchies for user data.

FIGS. 8A and 8B represent logical views of exemplary reliability hierarchies for user age data. The available sources of information, including online resources and the users of the client 1 may be ranked in order of reliability by information field and by any significant ranges of data (e.g., age<18 and age>=18). A given source of information may be highly reliable for one type of information yet unreliable for another type of information. Further, a given source of information may be reliable for a particular range of data but unreliable for data outside of that particular range. For example, with respect to the secondary user's age, information supplied by the primary user or information stored on the secondary user's SmartCard 9 may be considered the most reliable source of information when the age supplied is under 18 years. However, when the age supplied by the primary user is over 18 years, it may be that the secondary user is exploiting the primary user's account. Therefore, in these circumstances, information supplied by the primary user about the age of the secondary user may be considered one of the least reliable sources of information.

The hierarchies depicted in FIGS. 8A and 8B represent the relative reliability of an exemplary set of sources of a secondary user's age when the supplied age is less than 18 and when the supplied age is greater than or equal to 18 years, respectively. In this example, the sources of age data include: information supplied by the primary user of the client 1 810; a birth records database 820; a DMV database 830; a voter registration database 840; other commercial databases 850 such as mailing lists, Lexis®-Nexis®, etc.; and information supplied by a secondary user of the client 1 860.

As discussed above, when the age is less than 18, information supplied by the primary user 810 is considered very reliable. Next in reliability is the birth records database 820. Following the birth records database 820 in reliability is the voter registration database 840. Other commercial databases 850 are considered next to last in reliability, according to this example. Finally, information supplied by the secondary user is the least reliable source of information.

In contrast, when the supplied age is greater than 18, information supplied by the birth records database 820 is regarded as the most reliable source of data. The DMV database 830 is next in reliability. Following the DMV database 830 is the voter registration database 840. The least reliable sources of age information for this age range are other commercial databases 850, information supplied by the primary user 810, and information supplied by the secondary user 860, respectively.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. In a computer network that includes (i) a plurality of servers for accessing a plurality of network sites containing various types of content, as for example text, graphics and audio files, which can be viewed and listened to as appropriate, and downloaded when desired, and that includes (ii) a plurality of client systems each including a processor and input device for permitting connection to said network for purposes of browsing the network sites, a method of deriving user information such as age, identity or credit worthiness, about the users from one or more of the client systems as the network sites are browsed, and of associating the derived user information with a level of certainty regarding the accuracy of the derived information, the method comprising:

a step for monitoring on-line activity of a user as a client system is connected to the network as the user is browsing one or more sites on the network, said monitoring function comprising:

an act of parsing information received at a client system for a particular site and monitoring the parsed information the parsed information input to the client system; and an act of monitoring information output from the client system to one or more of the network servers;

a step for storing the monitored on-line activity about the user in a set of information fields, said step for storing the monitored on line activity comprising:

an act of associating each information field in the set of information fields with a status field, the status field indicating a level of certainty regarding the accuracy of information contained in the corresponding information field;

an act of, for a first information field in the set of information fields, determining whether a source of data exists that is more reliable than information currently contained in the first information field based upon a first status field corresponding to the first information field;

an act of retrieving information corresponding to the first information field from the source of data if it is determined that a more reliable source of data exists; and an act of replacing the information currently contained in the first information field with the retrieved information.

2. The method of claim 1, wherein the first status field includes one of a plurality of predefined levels of certainty regarding the accuracy of the information currently contained in the first information field.

3. The method of claim 1, wherein the step for monitoring on-line activity of a user includes an act of observing information transmitted to the client system from one or more of the network servers.

4. The method of claim 1, wherein the more reliable source of data comprises a database on a remote server.

5. The method of claim 1, further including an act of maintaining statistics related to the information transmitted to one or more of the network servers from the client system.

6. The method of claim 5 wherein the statistics include a count representing the number of times the user has input data that is inconsistent with the information currently contained in the first information field.

7. The method of claim 3, further including an act of maintaining statistics related to the information transmitted to the client system from the one or more network servers.

8. The method of claim 7, wherein the statistics include a count representing the number of times the user accesses Web pages belonging to a particular category of Web pages.

9. The method of claim 1, wherein the act of monitoring information output from the client system further includes an act of searching the outputted information for an indicator that is relevant to assessing the accuracy of the information contained in at least one or the information fields.

10. The method of claim 9, wherein the outputted information comprises input to a hypertext markup language (HTML) form.

11. The method of claim 3, wherein the act of observing information transmitted to the client system from one or more of the network servers further includes an act of searching the information transmitted to the client system for an indicator that is relevant to assessing the accuracy of the information contained in at least one or the information fields.

12. The method of claim 11, wherein the information transmitted to the client system comprises a hypertext markup language (HTML) document.

13. The method of claim 11, wherein the indicator comprises a Web page category.

14. The method of claim 1, wherein the method is operable within the client system.

15. The method of claim 1, wherein the method is operable within at least one or the network servers.

16. The method of claim 1, wherein the network sites include World Wide Web sites.

17. The method of claim 9, wherein the indicator comprises information that is inconsistent with the information contained in at least one of the information fields.

18. The method of claim 9, wherein the indicator comprises information that is consistent with the information contained in at least one of the information fields.

19. A machine-readable for use in a computer network that includes (i) a plurality of servers for accessing a plurality of network sites containing various types of content, as for example text, graphics and audio files, which can be viewed and listened to as appropriate, and downloaded when desired, and that includes (ii) a plurality of client systems each including a processor and input device for permitting connection to said network for purposes of browsing the network sites, the machine-readable medium having stored thereon machine-executable instructions which, when executed by a processor, cause said processor to perform a method of deriving user information such as age, identity or credit worthiness, about the users from one or more of the client systems as the network sites are browsed, and of associating the derived user information with a level of certainty regarding the accuracy of the derived information, wherein the method comprises the following:

monitoring on-line activity of a user as a client system is connected to the network as the user is browsing one or more sites on the network, said monitoring comprising:

parsing information received at a client system for a particular site and monitoring the parsed information output from the client system to one or more of the network servers;

storing the monitored on-line activity about the user in a set of information fields, said storing comprising:

associating each information field in the set of information fields with a status field, the status field indicating a level of certainty regarding the accuracy of information contained in the corresponding information field;

for a first information field in the set of information fields, determining whether a source of data exists that is more reliable than information currently contained in the first information field, based upon a first status field corresponding to the first information field;

if it was determined that a more reliable source of data exists, then retrieving information corresponding to the first information field from the more reliable source of data, and replacing the information currently contained in the first information field with the retrieved information.

* * * * *

UNITED STATES PATENT AND TRADEMARK OFFICE
CERTIFICATE OF CORRECTION

PATENT NO. : 6,141,694
DATED : October 31, 2000
INVENTOR(S) : Valerie Gardner

It is certified that error appears in the above-identified patent and that said Letters Patent is hereby corrected as shown below:

Title page,
Left column, after "Primary Examiner" change "Frank Asta" to -- Mark H. Rinehart --

Column 3,
Line 30, change "bidirectional" to -- bi-directional --
Line 34, after "through a" change "route" to -- router --

Column 6,
Line 32, change "123+45+7890" to -- 123-45-7890 --
Line 44, after "input/output" change "I/0" to -- I/O --

Column 7,
Line 25, after "or the" change "sever" to -- server --

Column 11,
Line 54, after "one" change "or" to -- of --

Column 12,
Line 4, after "one" change "or" to -- of --
Line 35, after "parsed information" insert -- input to the client system; and monitoring information --

Signed and Sealed this

Fourth Day of December, 2001

*Attest:*

NICHOLAS P. GODICI
*Attesting Officer*    *Acting Director of the United States Patent and Trademark Office*